Patented Dec. 25, 1945

2,391,821

UNITED STATES PATENT OFFICE 2,391,821

CRACKING OF ALPHA-METHYLSTYRENES

James Kenneth Dixon, Riverside, Conn., assignor to American Cyanamid Company, New York, N. Y., a corporation of Maine No Drawing. Application July 7, 1944, Serial No. 543,967

3 Claims. (Cl. 260—669)

This invention relates to the cracking of 4-methyl, alpha-methyl styrene. More particularly, the invention relates to a novel catalytic process of cracking 4-methyl, alpha-methyl styrene to p-methyl styrene in the vapor phase and to a novel catalyst for use in that process.

In my copending applications for U. S. Letters Patent, Serial No. 471,875, filed January 9, 1943, and Serial No. 491,939, filed June 23, 1943, the production of p-cymene and alpha, 4-dimethyl styrene from terpenes by catalytic dehydrogenation in the vapor phase has been set forth. Alpha, 4-dimethyl styrene, commonly designated as dimethyl styrene and so referred to in the present specification, is itself a product of great industrial utility for many purposes. For other purposes, p-methyl styrene is required. The latter is particularly useful in the production of copolymers with other polymerizable materials in the manufacture of various plasters, resins and synthetic rubber. p-Methyl styrene, however, is not readily produced directly from the terpenes which serve as the starting materials of my previously mentioned copending applications, which otherwise would constitute a highly desirable source.

It is, therefore, the principal object of the present invention to find a suitable procedure for removing one carbon atom from the isopropyl side chain of dimethyl styrene,

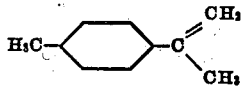

to convert the latter to p-methyl styrene,

when the latter is the preferred product. In general, this is accomplished according to the present invention by vaporizing dimethyl styrene, passing the vapors over a suitable cracking catalyst, condensing the condensible products and isolating the p-methyl styrene content thereof.

Dimethyl styrene, which has the formula

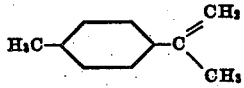

is so nearly analogous in structure of p-cymene,

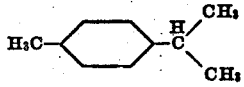

that it is to be expected that the two materials will undergo similar reactions when subjected to cracking conditions. Actually, according to the present invention, this is not found to be the case, whether in straight thermal cracking or in carrying out a catalyzed reaction.

Subjecting p-cymene to thermal cracking requires a temperature of above about 600° C. to produce any appreciable breakdown of the cymene. Temperatures of about 700° are required to produce effective conversions. At about this temperature, yields up to about 20% can be obtained although at the expense of a material loss of about one-third of the feed. Application of thermal cracking to dimethyl styrene indicates that it is even more difficult to decompose since temperatures up to 650–700° C. are required to produce any appreciable thermal cracking.

Attempts to reduce the thermal decomposition losses in cracking p-cymene by the use of a cracking catalyst such as a clay or a silica gel to reduce the temperature is not a suitable solution. The catalytic cracking of cymene produces toluene in high yields as the principal product. Apparently the tendency is for the molecule to break down along the bond $x$—$y$ of the formula

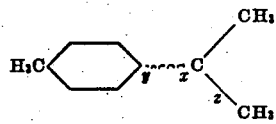

Catalytic cracking of dimethyl styrene would not be expected to result in a useful procedure since cleavage of the corresponding bond in dimethyl styrene would obviously prevent the formation of any styrene. Surprisingly, however, it has been found that by using a proper catalyst and suitable reaction conditions dimethyl styrene can be catalytically cracked in the vapor phase to produce p-methyl styrene at temperatures low enough to prevent excessive material losses.

Selection of a suitable catalyst for use in the process is not a simple problem. Because of the difficulty encountered with silica catalysts which produced toluene in cracking cymene, it would be supposed that a different type of catalyst such as a metal or metal oxide would be required. In attempts to carry out the process using catalysts of this type, the first result was to crack the dimethyl styrene to a mixture of products including hydrogen followed by a hydrogenation of dimethyl styrene to cymene. These catalysts, therefore, are not particularly suitable.

Surprisingly, according to the present invention, the same type of siliceous catalysts, comprising clay and/or silica which convert p-cymene to toluene are particularly well suited for the cracking of dimethyl styrene. Apparently they promote selective cracking along the bond $x-z$ in the formula

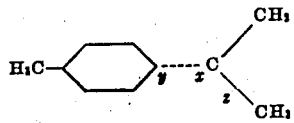

rather than along the bond $x-y$, where, as was noted above, cleavage occurs in the case of p-cymene.

A particularly useful siliceous catalyst was found to be one in which a major proportion comprises silica gel intimately admixed with a minor proportion of from about 5–30% of a metallic oxide such as that of aluminum. Other oxides which appear to be useful include those of zirconium, beryllium and titanium. The catalyst may be readily prepared in any one of a number of different ways. Although the various components of the combined catalyst in gel form may be precipitated separately, concurrently or consecutively, the effectiveness of the catalyst appears to be somewhat altered by the procedure by which the gels are initially associated. Perhaps, because it produces a somewhat more uniform mixture, concurrent precipitation appears to produce a preferable catalyst mass. One precaution should be taken if alkali metal salts are used in the preparation of the gels. Alkali metals or the oxides tend to promote undesirable formation of by-products. Considerable care should therefore be taken to free the catalyst body as far as practically possible from any remaining traces of the alkali metals. Ordinarily this is readily accomplished by washing.

In use, the catalyst may be in somewhat different physical states depending upon the method of precipitating the gels. If produced as solid pieces, the catalyst body may be broken up into suitable pieces, ordinarily from about 6–14 mesh. Preferably, however, it may be broken into finer pieces or precipitated in powdered form. In such cases, the catalyst may be pelleted into suitable sizes for use in the present process. This enables easier packing and more adequate control of the area and time of contact. One-eighth to one-quarter inch pellets were found to be suitable sizes. In developing the present process, it was found that about 5–15% of alumina gel, the remaining 85–90% being silica gel, produced a particularly effective catalyst.

In carrying out the process some hydrogen is necessarily formed during cracking. Under the influence of the catalyst a part of the hydrogen appears to be concurrently utilized to convert some of the p-methyl styrene to ethyl toluene. In fact, if the contact time is adequate, then the temperatures used in cracking are high enough to use up nearly all of $H_2$ to form ethyl toluene. This, however, is not a practical commercial limitation since ethyl toluene is itself a commercially useful product, is easily separated from the reaction products, and may be readily converted by well-known dehydrogenation procedures to additional quantities of p-methyl styrene. Actually it is an advantage in that a product of high purity is thereby quite readily obtained.

Under some circumstances cymene would also be produced by a similar hydrogenation of dimethyl styrene. While the removal of initial cymene from dimethyl styrene, which forms the starting material, would not be difficult, hydrogenation to cymene by side reactions makes separation of pure p-methyl styrene difficult. An advantage of the present cracking process is the clean-cut production of p-methyl styrene with little $H_2$ formation thus making isolation simple.

As compared with the 600–700° required for thermal cracking of cymene and/or dimethyl styrene, the present process is shown to be truly catalytic by the lower operating temperatures required. Some cracking is apparent as low as 350–400° C. and useful yields begin to be obtained at about 400–475° C. Above about 525° C. thermal decomposition of the products begins to be troublesome, resulting in smaller overall recoveries. For optimum operation, the temperature range should be preferably from about 350–500° for most catalyst compositions in the alumina-silica ratios of 1:20 to about 1:7.

Obviously the space-velocity over the catalyst has an effect on the nature of the products. Too low a rate results in excessive cracking and rehydrogenation. Too high a rate results in incomplete conversion. The exact numerical limits for all cases cannot be determined since the optimum depends upon the amount of catalyst, the particle size of the catalyst, the feed rates necessary to obtain production, the temperature, the catalyst composition and the like. However, the optimum for any set of conditions may be readily determined by fixing the other conditions and varying the feed rate.

Preferably, but not necessarily, the vaporized dimethyl styrene should be preheated. This was found to have a stabilizing effect on the whole reaction cycle, increasing both the total throughput for any one cycle and reducing the material losses through decomposition. The latter appeared to have a relationship to the temperature change which the vapors undergo while in contact with the catalyst. Preheating may be done either in a separate chamber, or in an initial portion of the catalytic converter. In the latter case, the preheating zone may be packed with catalytically inactive material if so desired.

The process of the present invention is not necessarily limited to the use of any particular apparatus. It is necessary that the material be converted to the vapor state and passed over the catalyst at a rate depending upon the temperature and the volume of the catalytic mass. The reacted vapors may be collected by condensation and separated into their component parts as by fractional distillation. So long as these functions are carried out the exact structure of the apparatus may be varied at will without departing from the scope of the present invention. Nor is the process limited to any particular materials from which the apparatus is to be constructed. Much of the development work was carried out using stainless steel reaction vessels. However, any material which is catalytically inactive, does not contaminate the materials and is resistant to intergranular attack by hydrogen liberated during the reaction may be used.

Where the apparatus is available for use, distinct improvements can be obtained by several modifications. Perhaps the simplest of these, although far from the least important, is the provision of an apparatus for condensing the reacted vapors as quickly as possible. Both dimethyl styrene and p-methyl styrene are capable of polymerizing rapidly at these temperatures, both with themselves and as copolymers. Therefore, in general the more rapid the condensation the more efficient the production.

Further improvements, both in the ease of operation and in the quality of the product, may be obtained by using the catalyst under suitable "fluid flow conditions." Several different types of apparatus are commercially available for this purpose. In general they all provide some means of passing the catalyst mass in a moving stream counter-currently to the flow of vapors. In that way the most active fresh catalyst is available at the point where it is most needed i. e., approximately the point at which the vapors leave the reaction chamber to pass into the condenser.

The present invention will be more fully illustrated in connection with the following examples which are illustrative only and not by way of limitation. All parts are by weight unless otherwise noted.

Example 1

A co-precipitated alumina-silica cracking catalyst, having an alumina-silica ratio of 1:11 was prepared in powdered form and pelleted into approximately ¼ inch cylindrical pellets. 600 ml. of the catalyst pellets was set up in a stainless-steel, catalytic conversion chamber. Dimethyl styrene of $N_D^{20}=1.530$ was vaporized at the rate of 15 cc./min., the vapors pre-heated to about 350°–400° C. and passed over the catalyst maintained at about 475°–490° C. The gas evolution amounting to about 0.5 ft./hr. and the condensable products were collected and sampled for analysis. In a two hour run the average product analysis was

| | Per cent |
|---|---|
| Dimethyl styrene | 45 |
| p-Methyl styrene | 17 |
| Ethyl toluene | 15 |
| Cymene | 7 |

Example 2

880 ml. of the pelleted catalyst of Example 1 was set up in a conversion chamber and dimethyl styrene of $N_D^{20}=1.533$ was vaporized at the rate of 12 cc./min., pre-heated and passed over the catalyst at about 500° C. Over a three hour run, about 1.5 cu.ft./hr. of gas was evolved and condensate amounting to 67% of the feed was recovered. The product averaged about 32% p-methyl styrene, 35% dimethyl styrene, 6–8% cymene and about 20–22% ethyl toluene.

Example 3

The catalytic mass of Example 2 was reactivated by being burned with air and additional dimethyl styrene of $N_D^{20}=1.533$ was vaporized at a rate of 20 ml./min., pre-heated and passed over a catalyst at 550° C. The off gas amounted to about 0.5 cu.ft./hr. and the condensate, amounting to about 85% of feed, had a $N_D^{20}=1.527-1.529$, containing about 28% methyl styrene, 47% dimethyl styrene, 4% cymene and 10% ethyl toluene.

Example 4

By way of comparison, with thermal cracking, dimethyl styrene having an $N_D^{20}$ of about 1.533 was vaporized at rates varying from 10–25 ml./min. and passed through a thermal cracking zone maintained at about 600° C. Very little methyl styrene was formed, the maximum amounting to not more than 6% for the best run.

I claim:

1. In a method of converting 4-methyl, alpha-methyl styrene to p-methyl styrene in the vapor phase, the steps of vaporizing the 4-methyl, alpha-methyl styrene, preheating the vaporized material to about 300–500° C. and passing the preheated vapors over a siliceous catalyst maintained at from about 400–575° C.

2. A method according to claim 1 in which the siliceous catalyst comprises an intimate mixture of anhydrous alumina and silica gels, the alumina-silica ratio being in the range of from about 1:20 to about 1:7 and containing substantially no alkali metal residues.

3. In a method of converting 4-methyl, alpha-methyl styrene to p-methyl styrene in the vapor phase, the steps of vaporizing the 4-methyl, alpha-methyl styrene, preheating the vaporized material to about 300–500° C., and passing the preheated vapors over a siliceous catalyst maintained at from about 400–575° C., and condensing the resultant vapors prior to the polymerization of the styrene derivatives contained therein and isolating the substantially unpolymerized 4-methyl, alpha-methyl styrene content in the condensate.

JAMES KENNETH DIXON.